2 Sheets--Sheet 1.

E. V. WINGARD.
Fruit-Gatherers.

No. 155,560. Patented Sept. 29, 1874.

WITNESSES

INVENTOR
Edwin V. Wingard
Chipman Hosmer & Co
ATTORNEYS

2 Sheets--Sheet 2.

E. V. WINGARD.
Fruit-Gatherers.

No. 155,560. Patented Sept. 29, 1874.

WITNESSES

INVENTOR

ATTORNEYS

UNITED STATES PATENT OFFICE.

EDWIN V. WINGARD, OF LOUISVILLE, KENTUCKY.

IMPROVEMENT IN FRUIT-GATHERERS.

Specification forming part of Letters Patent No. 155,560, dated September 29, 1874; application filed September 14, 1874.

*To all whom it may concern:*

Be it known that I, EDWIN V. WINGARD, of Louisville, in the county of Jefferson and State of Kentucky, have invented a new and valuable Improvement in Fruit-Gatherers; and I do hereby declare that the following is a full, clear, and exact description of the construction and operation of the same, reference being had to the annexed drawings making a part of this specification, and to the letters and figures of reference marked thereon.

Figure 1:
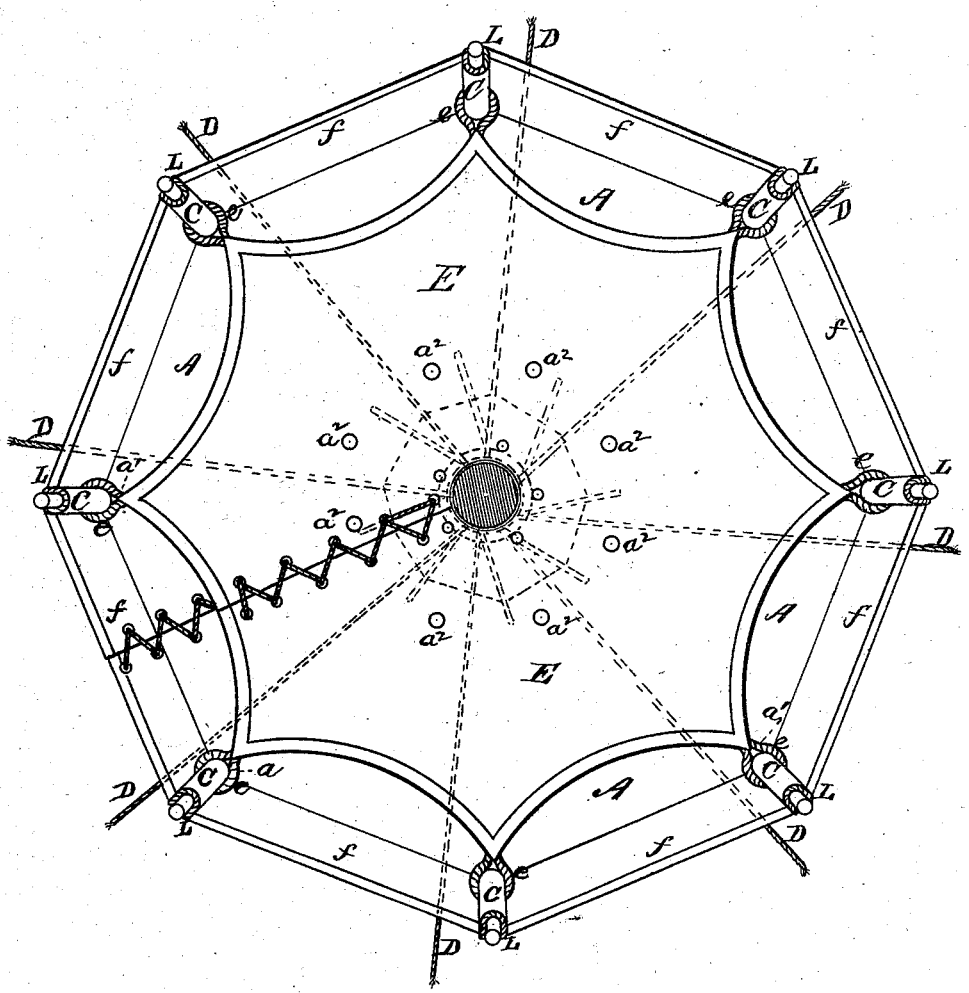
Figure 2:
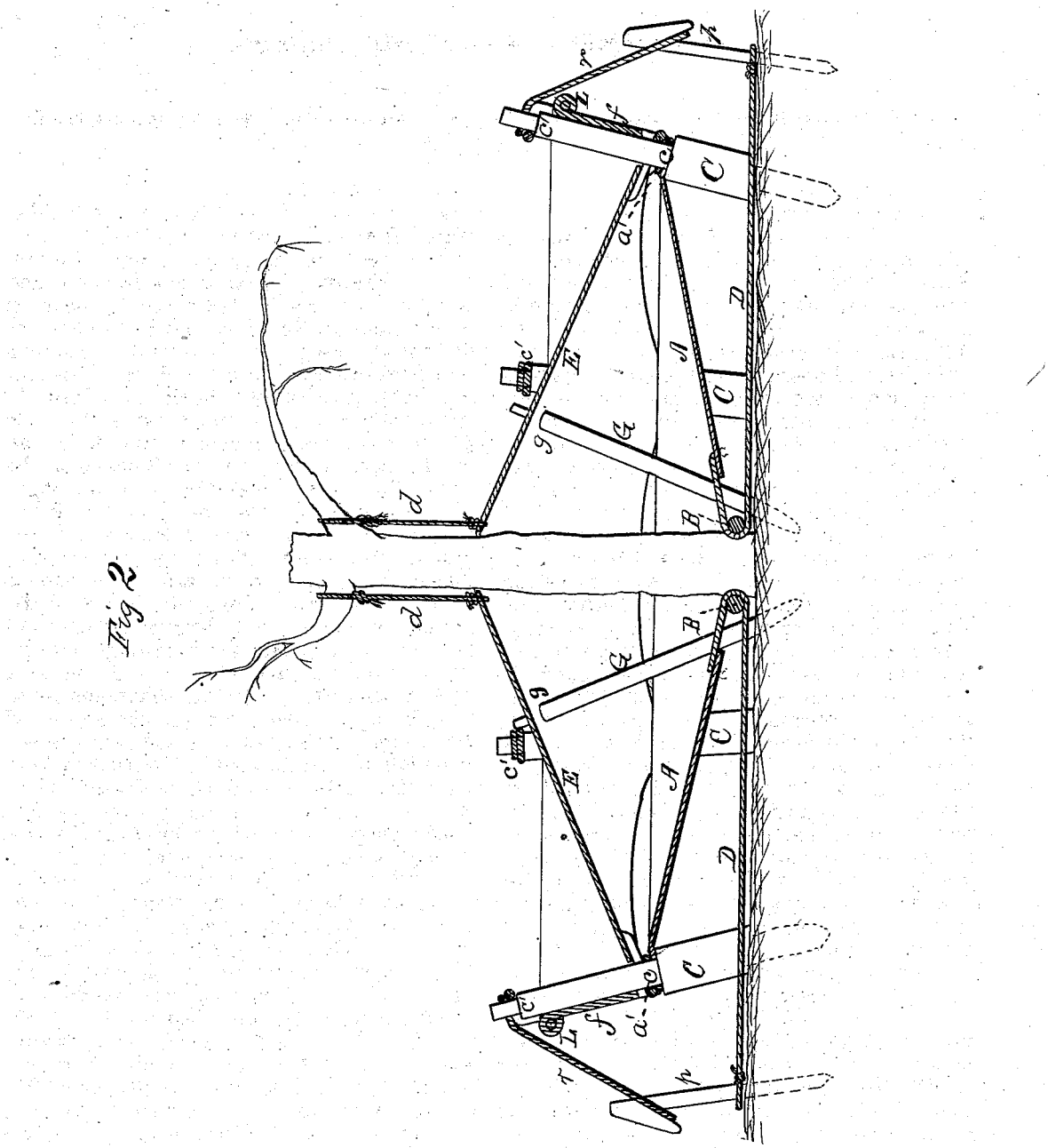

Figure 1 of the drawing is a representation of a top view of my fruit-gatherer. Fig. 2 is a vertical sectional view of the same.

This invention has relation to devices for preventing fruits from being bruised when they are shaken from the trees in gathering time; and the nature of the invention consists in combining with a flexible gathering-trough, of cloth or other similar material, surrounding the tree and sustained around its edges by means of stakes driven into the ground, a protecting-screen applied within the trough, the former inclining from its edges downward toward the tree, and the latter inclining downward from the tree toward its edges, whereby fruits, when shaken from the tree, are received by the screen, directed by the inclination thereof outward, to be received into the trough, and then, rolling inward, are allowed to escape through an opening therein upon the ground, thus not only preventing the fruit from being bruised by violent contact with the ground, but also with each other, all as will be hereinafter more fully explained.

In the annexed drawings, A designates a circular gathering-trough, made of any sufficiently strong flexible cloth. This trough is applied around the tree by means of a slit extending from the center to the edge thereof, and a certain space is cut out at the center, for a purpose which will hereinafter be made apparent. The outer and inner edges of the trough A are bound with strong cord, for the purpose of giving it greater strength; and it is applied around the tree in the following manner: I first encircle the tree with a strong hoop, B. The cloth is then caused to encircle the tree, and the edges of the slit are brought together and laced by passing a suitable cord alternately through a perforation in one of the edges thereof, and then in one in the other edge. Stakes C, having shoulders $c$ $c'$, are then driven into the ground around the tree at a suitable distance apart and from the tree, to which the trough is secured by means of perforations $a^1$, which are made through the body of the trough at a suitable distance from its peripheral edges, into which the stakes are introduced as far as the shoulder $c$. Cords D, rigidly secured to the inner edges, are then passed into the ring on hoop B, and, the trough having been drawn taut, are fastened to the stakes C. The shoulder $c$ being at the height of a foot or more from the ground, and the hoop being at the root of the tree on the ground, the bottom of the trough will have the effect, owing to its inward inclination, of directing the fruit falling into it toward the center, when it will fall through the aperture between the inner edges of the trough and the trunk of the tree upon the ground; but as a large accumulation of fruit at that point would soon fill up the space between the bottom of the trough and the ground, so that subsequent fruits falling therein would be bruised by coming in violent contact with those already fallen, some means becomes necessary to obviate this disadvantage. I have therefore caused a protecting-screen, E, to be applied around the tree within the trough or receiver A, secured, by means of loops $e$, to the stakes C, its central part being raised above the horizontal plane of its edges by means of ropes $d$, which, when passed over the crutch of the tree, drawn tight, and properly fastened, will hold the said protecting-shield in this position—that is to say, with a downward inclination from its center outward. When fruit is shaken from the tree it will first be received by the shield E, directed downward and outward to fall into the receiver A, thence inward to the center thereof to the ground, upon which it will gently fall, thus escaping all bruises, either in striking the earth or in coming in contact with each other.

With a view to preventing the casual scattering of the falling fruit in the outward course imparted to it by the shield E, I have caused the outer edges of the receiver A to be turned upward, as shown in Fig. 2, forming a flange, $f$, which is held in position by means of loops L, which are passed over stakes C, and are prevented from undue descent thereon by means of the shoulders $c'$.

In order to sustain the shield when subjected to the strain of a heavy mass of falling fruit, or when, from the large spread of the tree, the shield is made to cover a large area, I cause stakes G to be driven into the ground in a slanting position, as shown in Fig. 2, in order to avoid the receiver A. These stakes have a reduced upper end, forming a shoulder, $g$, whereby the shield is sustained when the reduced ends of the said stakes are introduced into holes $a^2$ thereof made for the purpose.

The stakes C, which are preferably driven into the ground in a slanting position, may also be stayed by ropes $r$, which are attached to the said stakes and to a notched pin, $p$, driven into the ground outside of the stakes. In this latter case, instead of securing the tightening-ropes D to the stakes C, as above described, I may belay them to the pins $p$, as shown in Fig. 2.

What I claim as new, and desire to secure by Letters Patent, is—

1. The combination, with the receiver A, of a protecting screen or shield, E, applied within the trough or receiver, substantially as and for the purpose set forth.

2. The combination, with the stakes C, having shoulders $c\ c'$, of the receiver A, having loops L, and the shield E, having loops $e$, substantially as and for the purpose specified.

3. The combination of the receiver A, having the surrounding flange $f$ and the central opening, and the protecting-shield E, substantially as and for the purpose described.

4. The combination, with a gathering-trough, A, surrounding a tree, of a protecting-screen, E, applied within the trough, said screen inclining downward from the tree toward its edges, and the trough inclining from its edges downward toward the tree, substantially as and for the purpose set forth.

In testimony that I claim the above I have hereunto subscribed my name in the presence of two witnesses.

E. V. WINGARD.

Witnesses:
H. C. HOLLINGSHEAD,
FRANK J. MASI.